3,323,320
MACHINE FOR MAKING ICE CREAM
Loris Conz, Viale Marconi 4, Pordenone, Udine, Italy
Filed June 27, 1966, Ser. No. 560,590
Claims priority, application Italy, July 5, 1965, 6,535
6 Claims. (Cl. 62—303)

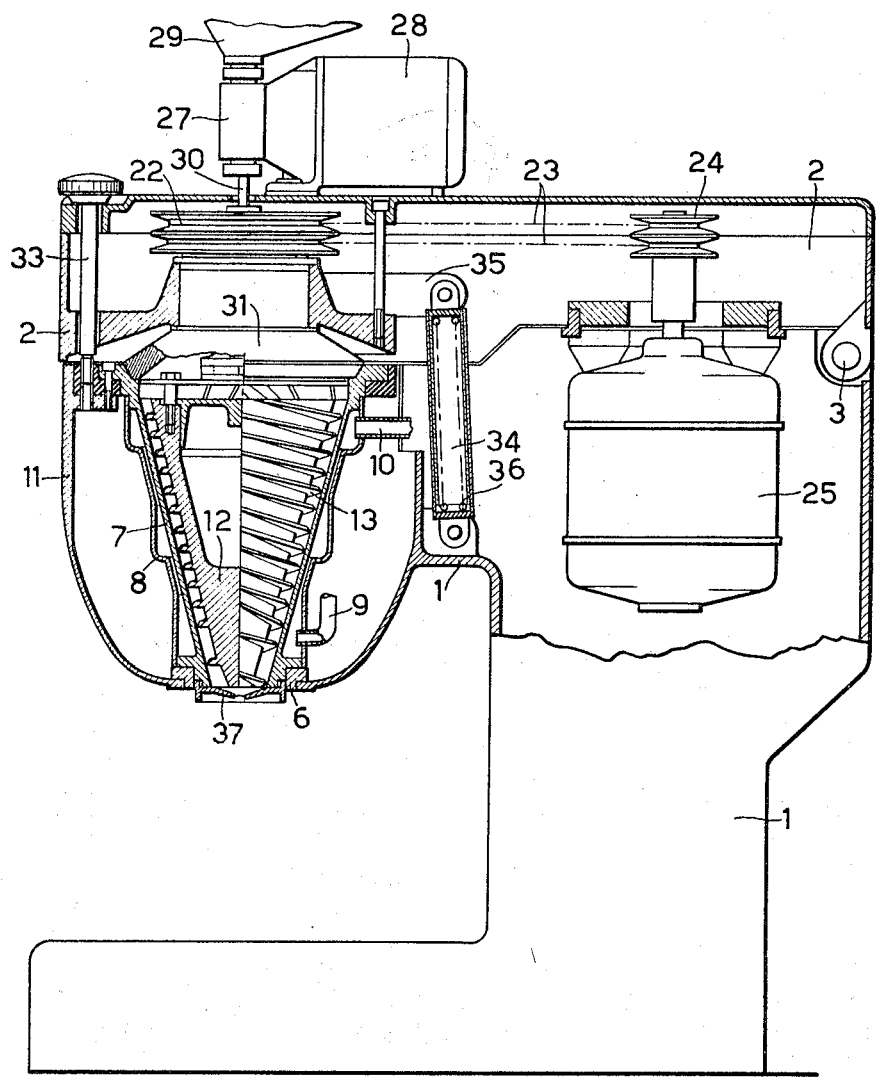

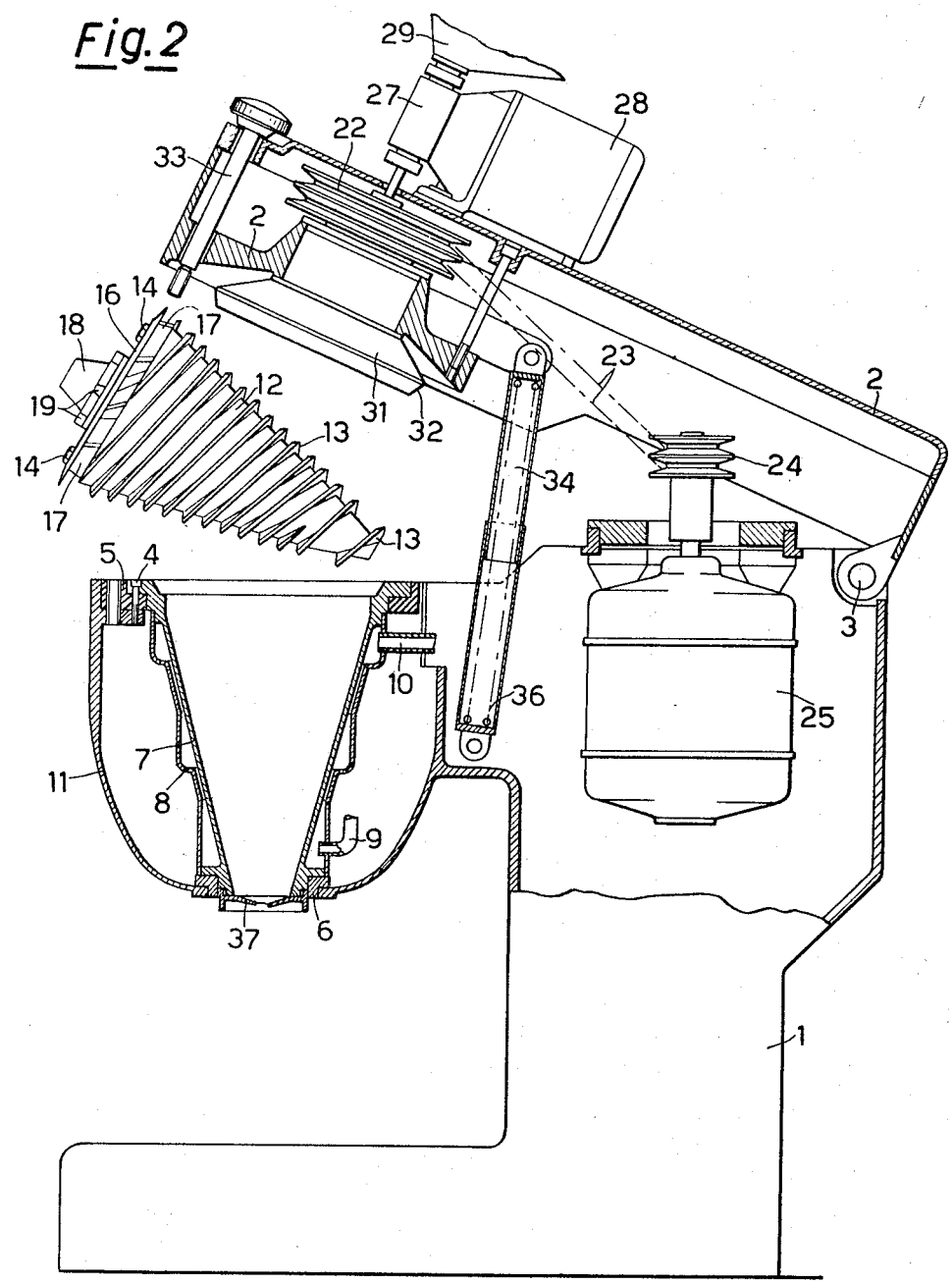

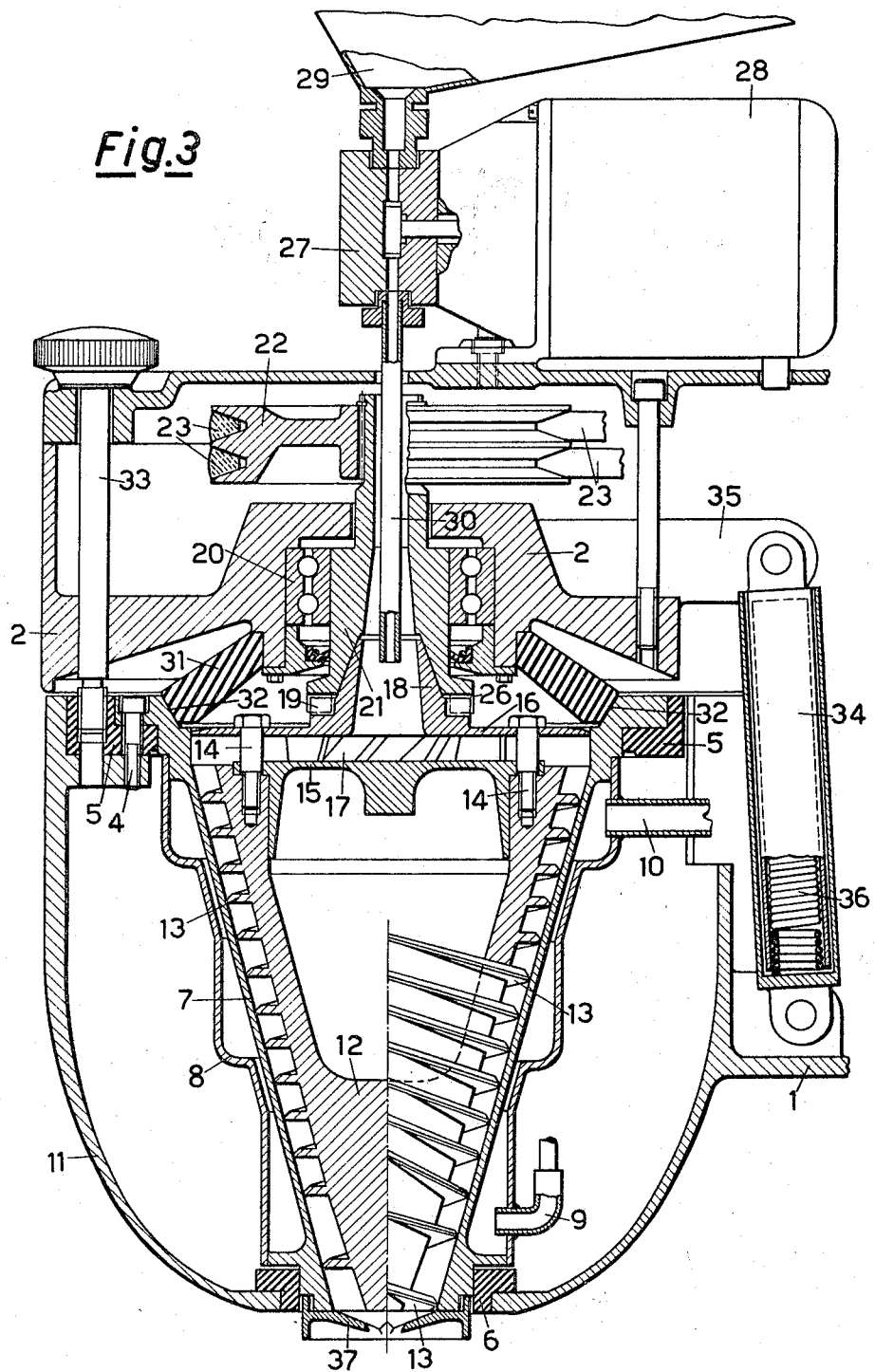

ABSTRACT OF THE DISCLOSURE

The ice cream making machine includes a casing, a body defined by an inner wall and an outer wall including a jacket therebetween fixed in the casing, the inner wall enclosing a space and having its inner surface in the form of a smooth surface of revolution, a source of refrigerating fluid, conduit means connecting the jacket with the source of refrigerating fluid, a cover hinged on the casing, a shaft freely rotatable on its own axis supported by the cover, means for imparting rotation to the shaft, the axis of the shaft coinciding with the axis of the surface of revolution when the cover is closed on the casing, a member freely enclosed in the space and having a helicoidal finning on its outer surface with the outer peripheral profile being in contact with the inner surface of the inner wall, and the member and shaft having complementary disengagable clutch means for connecting the member and shaft together when the cover is closed on the casing.

---

The present invention relates to a machine for making ice cream, particularly a machine for making ice cream with continuous operation.

The use of machines for making ice cream, is very wide and is expanding more and more.

Food substances prepared to be transformed into ice cream are liable to decay and can become toxic, especially when made from eggs and milk, if exposed to air at room temperature for a long time.

Rules of common prudence and hygiene and often precise sanitary provisions and laws prescribe that a machine for making ice cream, after each operation, be frequently cleaned and washed in all the parts which come in contact with the food substance, so as to avoid residual portions of the same, or of the ice cream, being left in the machine and, therefore, undergoing deterioration.

All of the parts of the machine coming in contact with the food substance forming the ice cream, therefore, must be completely inspectionable and accessible for cleaning purposes.

The ice cream machines in the prior art show a serious drawback consisting in the fact that the access to the inner parts thereof involves the necessity of removing them with complicated operations requiring an exceedingly long time.

It is an object of the present invention, therefore, to provide a machine for making ice cream which permits complete inspection of its inner parts contacting the food substances, which can be performed even by an unskilled person by merely opening the machine through a very easy and simple operation.

Another object is to provide a machine which, after being opened for inspection and cleaning of its inner parts, can be assembled and closed again in an easy and rapid manner with the various parts of the machine being placed automatically in their mutual position ready for operation.

Still another object is to provide a machine in which, when the machine is open, the mechanical parts provided for transmitting motion to the driven parts are separated from those parts of the machine which can come in contact with food substances.

The above objects are attained with a machine for making ice cream comprising a first, a second and a third group of elements, the first group comprising a casing, and, fixed therein, a body formed by an inner wall and an outer wall including a jacket therebetween, the inner wall enclosing a space and having its inner surface in the form of surface of revolution, conduit means for connecting said jacket with a source of refrigerating fluid, said second group of elements comprising a cover hinged on said casing, a hollow shaft freely rotating on its own axis and supported by said cover, means for imparting rotation to said hollow, the axis of said shaft coinciding with the axis of said surface of revolution when the cover is closed on said casing, said third group of elements comprising a member freely enclosed in said space, said member having on its outer surface a helicoidal finning the outer peripheral profile being in contact with the inner surface of said inner wall, and said finned member and said hollow shaft being provided with complementary clutch means connecting said member and said hollow shaft together when the cover is closed on the casing.

In order to clarify comprehension of the structure and operation of the machine, an embodiment of the same will now be described, by way of example without limitation, with reference being made to the annexed drawings, wherein:

FIG. 1 is a diagrammatic side view, partially in section, of a machine with the cover closed on the base, in an operating condition, FIG. 2 is a view generally similar to FIG. 1 illustrating the cover raised with respect to the casing, and with the finned body removed from the machine, and FIG. 3 shows in detail on an enlarged scale in cross section a portion of the machine under the conditions as shown in FIG. 1.

The machine illustrated in the drawings comprises a casing 1 and a cover 2 pivotable on the casing through a hinge 3. A member consisting of an inner wall 7 and an outer wall 8 enclosing a jacket therebetween, is fixed on the casing by means of screws 4 with the interposition of thermally insulating gaskets 5 and 6. The inner surface of the inner wall 7 is in the form of surface of revolution and encloses an inner space of a conical shape with its base directed toward the cover 2. The jacket formed between the walls 7 and 8 is connected through conduits 9 and 10 to a source of refrigerating fluid (not illustrated) for sake of simplicity. The refrigerating fluid circulates in the aforementioned jacket and causes an active cooling of the walls 7 and 8. The thermal insulation of the member comprising the walls 7 and 8 is assured by the gaskets 5 and 6 and, in addition, by an envelope 11 forming part of the casing 1 and enclosing said member.

The conical space delimited by the wall 7 contains a conical member 12 freely supported therein and provided on its outer surface with a finning 13 made of several helical fins or ribs, the outer edge of which is in contact with the inner surface of the wall 7.

The member 12 can rotate freely in the conical space, thus scraping the inner surface of the wall 7 by the edges of the fins 13, as will appear more clearly hereinafter. The member 12 can be removed freely from the said conical space, as it is shown in FIG. 2.

Two discs 15 and 16 respectively are fixed to the member 12 by means of screws 14 and enclose impeller blades 17. The disc 16 has a central hole delimited by a piece 18 having a conical outer surface from the base of which teeth 19 project.

The cover 2 supports through ball bearings 20 a hollow shaft 21 freely rotatable on its axis. A multi-groove pulley 22 is fixed on the upper end of said hollow shaft and V-belts 23, partially illustrated in FIG. 3 and diagrammatically represented by dot-and-dash lines in FIG. 2, connect said pulley for rotation with a similar pulley 24 keyed on the driving shaft of an electric motor 25 supported by the casing 1.

It is to be noted that under the conditions of FIG. 1, the belts 23 are under tension between the pulleys 22 and 24, whereas when the cover 2 is raised to the position shown in FIG. 2 the belts are slackened due to the relative position of the hinge 3 and the pulleys 22 and 24. In this latter condition, however, the tension of the belts is sufficient to prevent them from slipping out of the grooves of the pulleys.

At the lower end of the hollow shaft 21 teeth 26 (FIG. 3) project in contraposition to the teeth 19 projecting from the piece 18. The teeth 26 automatically engage with the teeth 19 to provide a dog clutch as soon as the cover 2 is closed on the casing 1 and are disengaged therefrom automatically as soon as the cover is raised to the position of FIG. 2, in which condition the member 12 can be removed from the casing of the machine. Under the condition of FIGS. 1 and 3, the member 12 is connected for rotation with the hollow shaft 21.

A dosing pump 27 is mounted on the cover 2 and is driven by an electric motor 28. A funnel-shaped receptacle 29 is arranged above said pump and a pipe 30 issues below the pump and extends into the bore of the hollow shaft 21 in coaxial relation thereto.

The cover 2 supports an element 31, of thermally insulated material having a conical lower end surface 32 which, when the cover 2 is closed on the casing of the machine, rests on a correspondingly conical seat provided in the upper portion of the wall 7. The function of the elements 31, in addition to providing insulation and a seal between the parts of the machine fixed to the casing and the parts supported by the cover, is to keep the hollow shaft 21 perfectly centered in a coaxial relation with respect to the member 12 when the cover is moved from the raised position to the closed position on the casing of the machine. A screw 33 held in the cover 2 provides a locking means for the latter on the casing in the closed position when screwed in an oppositely located aperture provided in the casing.

A telescopic means 34 including two cylinders one inside the other and connected by pins to the casing and to a bracket 35 projecting from the cover 2 respectively forces the cover upward through the action of a spring 36 enclosed within said cylinders. The function of the telescopic means 34 is to maintain the cover 2 raised when the screw 33 is unscrewed.

For understanding the operation of the machine, the latter is to be visualized under the condition shown in FIGS. 1 and 3, that is ready for operation. When the motor 25 is started, the pulleys 22 and 24 rotate together with the hollow shaft 21, which rotates in turn the member 12 through the clutch means 19–26.

By starting the motor 28, which is a synchronous motor like the motor 25, the dosing pump 27 is started. In this condition, if a liquid to be made into ice cream is poured in the funnel shaped receptacle 29, the dosing pump 27 conveys through the tube 30 a determined rate of liquid which is proportional to the rotary speed of the shaft 21. The impeller fixed to the member 12 rotates together with the shaft 21. The rotation of such impeller causes a suction of air in the interspace present between the hollow shaft 21 and the tube 30, and which air forms between the blades 17 of the impeller an extremely fine homogeneous suspension with the liquid falling from the tube 30 and being subjected to centrifugal action by the impeller against the wall 7 which is intensely cooled by a refrigerating fluid as stated above. The suspension of air and liquid in contact with the wall 7 freezes and is scraped by the fins 13 and urged towards the bottom to be expelled from the lower end of said wall 7 through an outlet opening provided in a threaded ring 37 screwed on the wall 7. When the motors are stopped, the production of ice cream is immediately discontinued and this production, if desired, can be continued for an indefinite period of time.

If the machine is to be cleaned by removing any residue of food substance therefrom, the screw 33 is unscrewed and the cover 2 is lifted to the position shown in FIG. 2. The teeth 26 of the clutch are automatically disengaged from the teeth 19 and the member 12 can be removed from the machine. The threaded ring 37 can be unscrewed, whereby said ring, the inner surface of the wall 7, the member 12 together with its fins 13 and the blades 17 of the impeller can be easily and completely washed. The tube 30 is unscrewed from the body of the dosing pump 27 and can also be fully washed, as well as the bore of the hollow shaft 21 and the body of the pump 27.

As can be appreciated, the opening of the machine is an extremely quick and easy operation, whereby it is possible to clean perfectly all the parts of the machine which come in contact with food substances.

When the machine is cleaned, it can be placed in operating condition in a similarly quick and easy manner. After screwing the tube 30 on the body of the pump 27, the ring 37 on the lower end of the wall 7, and by inserting the member 12 onto its seat delimited by the wall 7, it is sufficient to lower the cover 2 on the casing 1 for effecting the automatic engagement of the teeth 19 with the teeth 26. After locking the cover in the closed position on the casing by means of the screw 33, the machine is ready for further operation.

I claim:

1. A machine for making ice cream comprising a first, a second and a third group of elements, the first group comprising a casing, a body defined by an inner wall and an outer wall including a jacket therebetween fixed in the casing, the inner wall enclosing a space and having its inner surface in the form of a smooth surface of revolution, a source of refrigerating fluid, conduit means connecting said jacket with said source of refrigerating fluid, said second group of elements comprising a cover hinged on said casing, a shaft freely rotatable on its own axis supported by said cover, means for imparting rotation to said shaft, the axis of said shaft coinciding with the axis of said surface of revolution when the cover is closed on said casing, said third group of elements comprising a member freely enclosed in said space and having a helicoidal finning on its outer surface with the outer peripheral profile being in contact with the inner surface of said inner wall, and member and said shaft being provided with complementary disengageable clutch means for connecting said member and shaft together when the cover is closed on the casing.

2. The machine as claimed in claim 1 in which said shaft is hollow and means on said cover for feeding food substances to be made into ice cream into the bore of said hollow shaft.

3. The machine as claimed in claim 1 in which said shaft is hollow, an upper source of food substances, and a tube connected to said upper source of food substances within said shaft.

4. The machine as claimed in claim 1 in which said clutch means comprise two parts, one of which parts is fixed to said shaft and the other part is fixed to said member having finning.

5. The machine as claimed in claim 1 in which an impeller is fixed to said member having finning coaxially therewith under the lower end of said hollow shaft.

6. The machine as claimed in claim 1, in which said casing is provided with a conical seat having its larger section directed toward said cover, said cover being provided with a piece having a conical surface complementary to said conical seat and resting the latter when said cover is closed on said casing, whereby said shaft and said surface of revolution are maintained in a coaxial position.

References Cited
UNITED STATES PATENTS

| | | |
|---|---|---|
| 1,414,727 | 5/1922 | Edmands. |
| 2,295,098 | 9/1942 | Cornell _____ 259—122 X |
| 2,415,585 | 2/1947 | Genova. |
| 2,541,814 | 2/1951 | Gaddini. |

MEYER PERLIN, *Primary Examiner.*

ROBERT A. O'LEARY, *Examiner.*

W. E. WAYNER, *Assistant Examiner.*